(12) United States Patent
Norman (10) Patent No.: US 7,804,452 B2
(45) Date of Patent: Sep. 28, 2010

(54) SAFETY MAST

(76) Inventor: Valentino Norman, P.O. Box 211105, Brooklyn, NY (US) 11221

( * ) Notice: Subject to any disclaimer, the term of this patent is extended or adjusted under 35 U.S.C. 154(b) by 61 days.

(21) Appl. No.: 12/008,783

(22) Filed: Mar. 15, 2008

(65) Prior Publication Data

US 2009/0231231 A1 Sep. 17, 2009

(51) Int. Cl.
*H01Q 1/24* (2006.01)
*H01Q 1/10* (2006.01)
(52) U.S. Cl. .................................. 343/702; 343/901

(58) Field of Classification Search .............. 343/702, 343/841, 901
See application file for complete search history.

(56) References Cited

U.S. PATENT DOCUMENTS 6,437,746 B1 * 8/2002 Van Hoozen ................ 343/702

* cited by examiner

*Primary Examiner*—Hoang V Nguyen (57) ABSTRACT

The safety mast and the double safety mast both distance the transmitter from its controls and operator thus reducing radiation to both. The transmitter must be separated from its controls prior to installation.

11 Claims, 10 Drawing Sheets

SAFETY MAST

CROSS-REFERENCE OF RELATED APPLICATIONS

N/A

STATEMENT REGARDING FEDERALLY SPONSORED RESEARCH OR DEVELOPMENT

N/A

THE NAMES OF THE PARTIES TO A JOINT RESEARCH AGREEMENT

N/A

BACKGROUND OF THE INVENTION

1. Field of the Invention

This invention relates to the safety of people using cellular phones and other relative equipment by placing the radio transmitter and it's antenna a distance away from the manual controls of the unit thus reducing radiation emissions asspecilly to the hands and head while in use. And after use return the transmitter and it's antenna to original position near it's controls so to be compack for convent transport.

2. Description of Related Art

Radio reception and transmission was known for decades and humans have been fascinated with wireless communication and it's convenience to be able to send message over great distance without wire. However it has only been in our recent past that human produced telephones small enough to fit in a packet, sustain long distance, and with internet capability. Walky talky, transponder, cellular, and other such communication devices emit electromagnetic radiation. The humans that are in close approximation of these devices in some cases may be expose to radiation for long amounts of time. For example, some people can talk on a cell phone ten hours a day if not more. Typically a high percentage of this radiation travel through the head of the human body even with accessories such as earphone sets are used; even your Smartphone is on speaker mode or voice dialing and the phone is not in the same environment as the head, your hands may be exposed to high frequency electromagnetic radiation or waves. At this time. there is no individual information on the negative effects on cellular phone use; however studies on this subject are still being done. There is always a need for a method of reducing the potential danger of these electronic devices.

BRIEF SUMMARY OF THE INVENTION

This invention satisfies the above needs; a novel SAFETY MAST unit that would reduce the concentration of cell phones and other such devices radiation from frequency transmission. The present invention uses a mast to separate the transmitter portion from the control of the cellular phone and other such devices or equipment. All manually operated control would be put at a distance from its transmitter, and an antenna that would be placed in the cavity of the mast. The mast is mounted on the back of the cell phone; for example, the portion that would be mounted on the phone is called the bracket; the mast is primarily comprised of a mobile section that telescopes in to each other; the cavity that would usually be the top or the last of the section namely the safety mast section would be in a contracted position for convenient transport. Once the antenna is fully extended, thus the radiation is reduced from its operator when the phone is used because the transmitter and its antenna will be away from operator. The transmitter can still operate while the mast is in compact mode, however for better protection the operator must fully extend the mast. Fiber optic and optic would be the basic way the transmitter and controls would communicate with each other; there are other ways if needed. Power supplies for the transmitter usually would be a battery compartment in cavity; however, the transmitter has another source as well to receive power.

Another embodiment that extends its transmitter and antenna away from its operator and its controls is called the double safety mast. This safety mast is design for low wind resistance for high wind conditions. This present invention utilizes an arrangement of an individual mast. Each mast is comprised of multiple sections that telescope each other, the cavity is supported equally between both mast.

The cavity of the double would contain the cell phones transmitter and antenna. Once the double safety mask is extended, it will reduce the emission from the cellular phone control and its effect on the operator. After use, the double safety mask is retracted for convenient transport the double safety mast is designed so once extended it can be defected by hand to horizontal position for added convenience.

Once the operator is finished with cell phone the double mast is then vertically aligned and depressed by its hand grip back into its bracket for convenient transport.

A third preferred embodiment of the present invention is referred to as a spring loaded safety mast. The spring loaded safety mast has an elongated spring which is normally the length of the extended mast extending from the bottom of the bracket to the base of the cavity. The spring is enclosed in the sectional tubular configuration of the mast that can telescope into each other. The tubular configuration keeps the spring in line while being compressed once the mast is retracted; when retracted by hand, it can be extended automatically by means of a release button. The release button is attached to the bracket and the other portion of the button would rest in a notch area on the mast this would prevent the mast from extending unless the button is depressed. Once depressed, the spring extends the safety mast and the transmitter from its controls thus reducing radiation from operator, the button is individually spring loaded so that it can return the catch to same notch area once the mast is retracted. The bracket that portion attached to the controls communicate with its transmitter using an optical system.

A fourth preferred embodiment of the invention is referred to as a power safety mast. The power safety mast utilizes an electromechanical arrangement to extend its cavity with its transmitter and antenna away from the controls and the cell phone operator thus reducing radiation to both. This invention consists of multiple sections that telescope into each other; at one end of the sections is the cavity at the other end is the bracket; the cavity would contain the transmitter and its antenna, and the bracket would attach to the controls of the cellular phone; the bracket of the power safety mast is equipped with a reversible electric motor. Attached to the rotor of the electric motor is a spool of flexible shaft that is attached to the base of the cavity, and the switch would normally be in the off position, when the switch is depressed extend mode. The mast electric motor drives the flexible shaft through a guide extending the cavity and its contents away from its controls and its cellular phone operator thus reducing radiation to both. The mast would remain extended until the operator depress the retract button thus contracting the mast and cavity more conveniently for transport.

BRIEF DESCRIPTION OF THE DRAWINGS

These and other features, aspects and advantages of the present invention may be understood with reference to the following drawing wherein.

DETAILED DESCRIPTION

The present invention is directed to distance separation of transmitter of electromagnetic broadcast radiation from its operator and manual controls of such equipment by use of multiple sections that would extend the transmitter from its manual controls. This done by placing the transmitter in one compartment and the controls in another compartment that would be separated by the sections that can telescope into each if needed for convenience.

Figure 1:
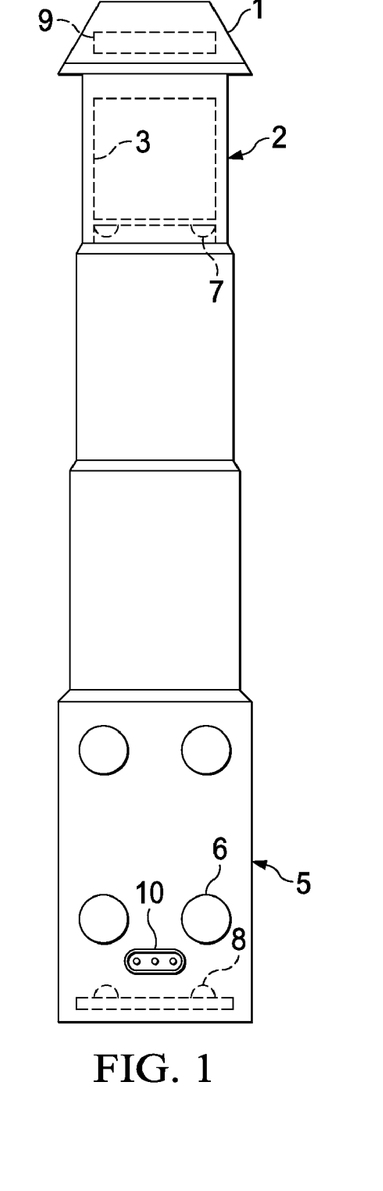
FIG. 1 illustrates a radiation reducing unit.
Figure 2:
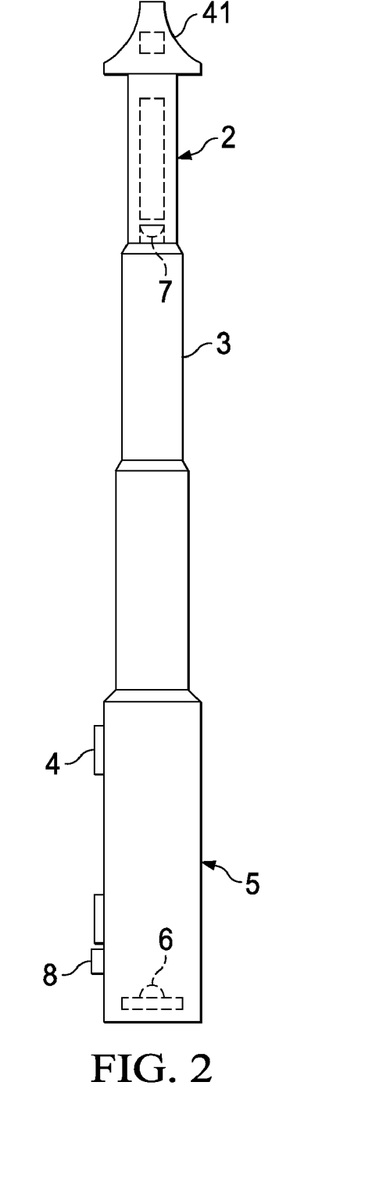
FIG. 2 illustrates components of the radiation reducing unit.
Figure 3:
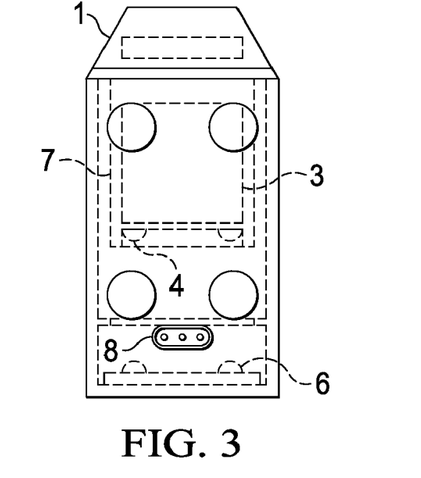
FIG. 3 illustrates additional components of the radiation reducing unit.
Figure 4:
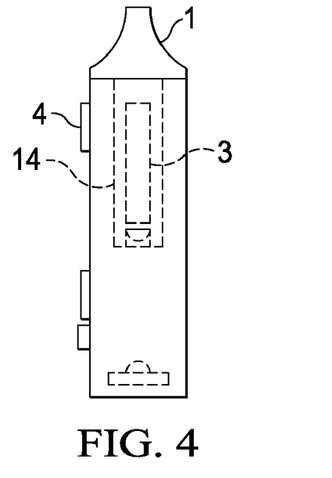
FIG. 4 illustrates further components of the radiation reducing unit.
Figure 5:
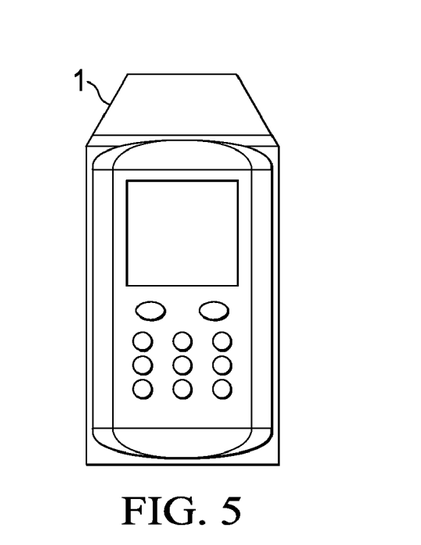
FIG. 5 illustrates a front view of the cellular phone.
Figure 6:
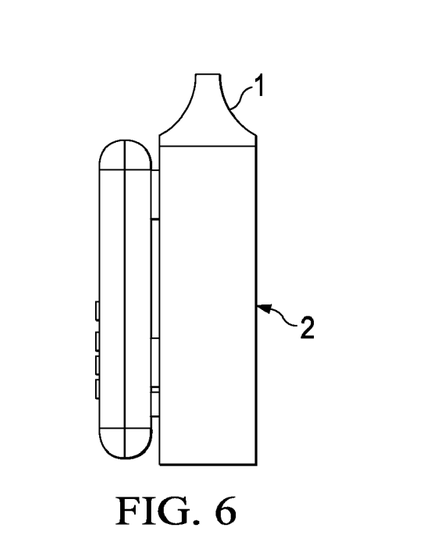
FIG. 6 illustrates a side view of the cellular phone.
Figure 7:
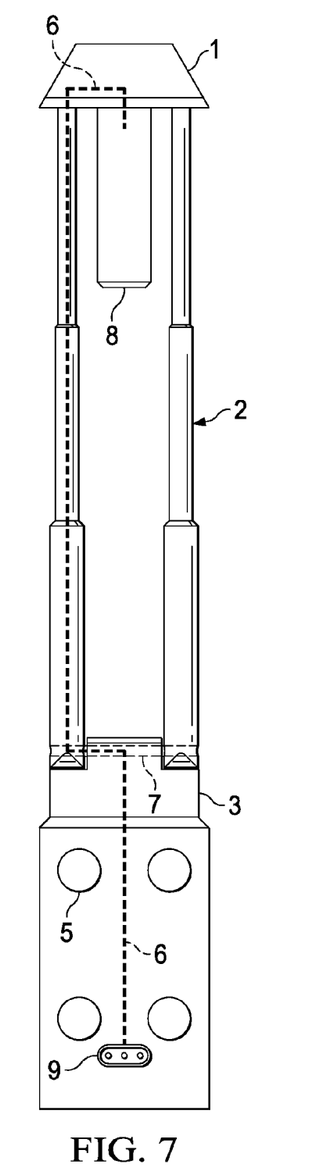
FIG. 7 illustrates a front view of a double safety mast.
Figure 8:
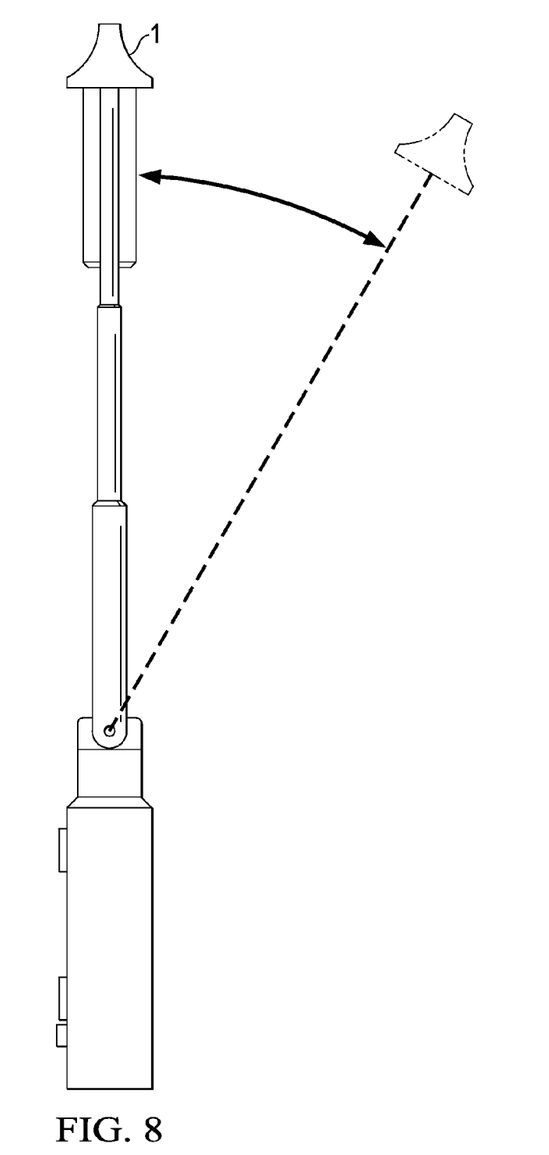
FIG. 8 illustrates a side view of the double safety mask.
Figure 9:
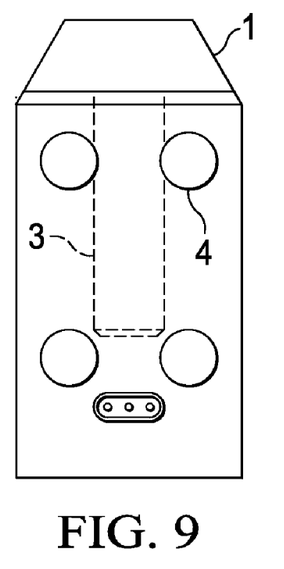
FIG. 9 illustrates a sectional front view.
Figure 10:
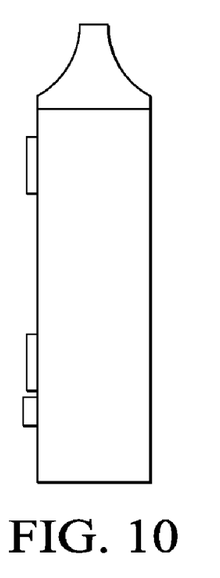
FIG. 10 illustrates a sectional side view.
Figure 11:
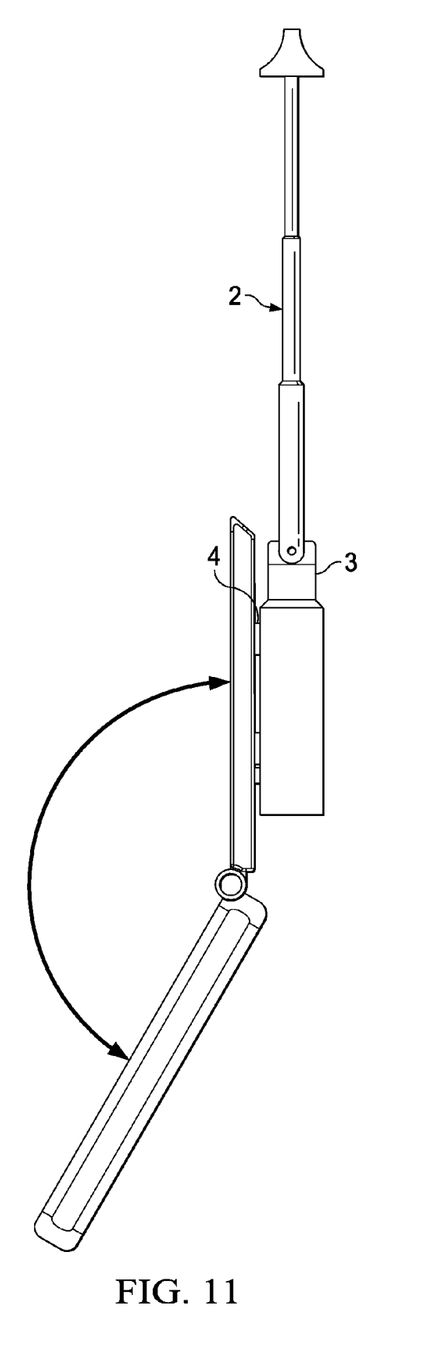
FIG. 11 illustrates a side view of another embodiment.
Figure 12:
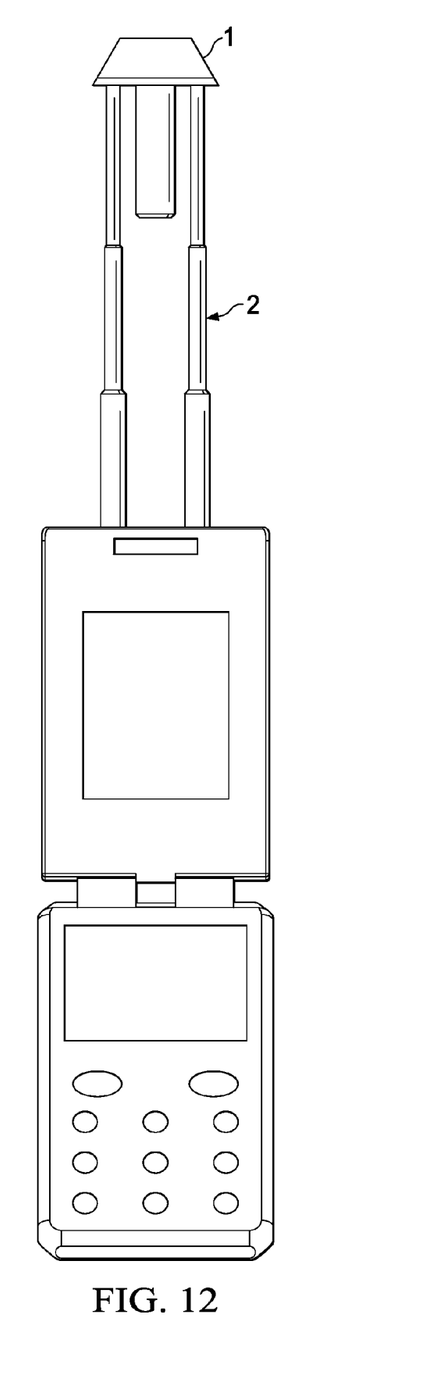
FIG. 12 illustrates a front view of another embodiment.
Figure 13:
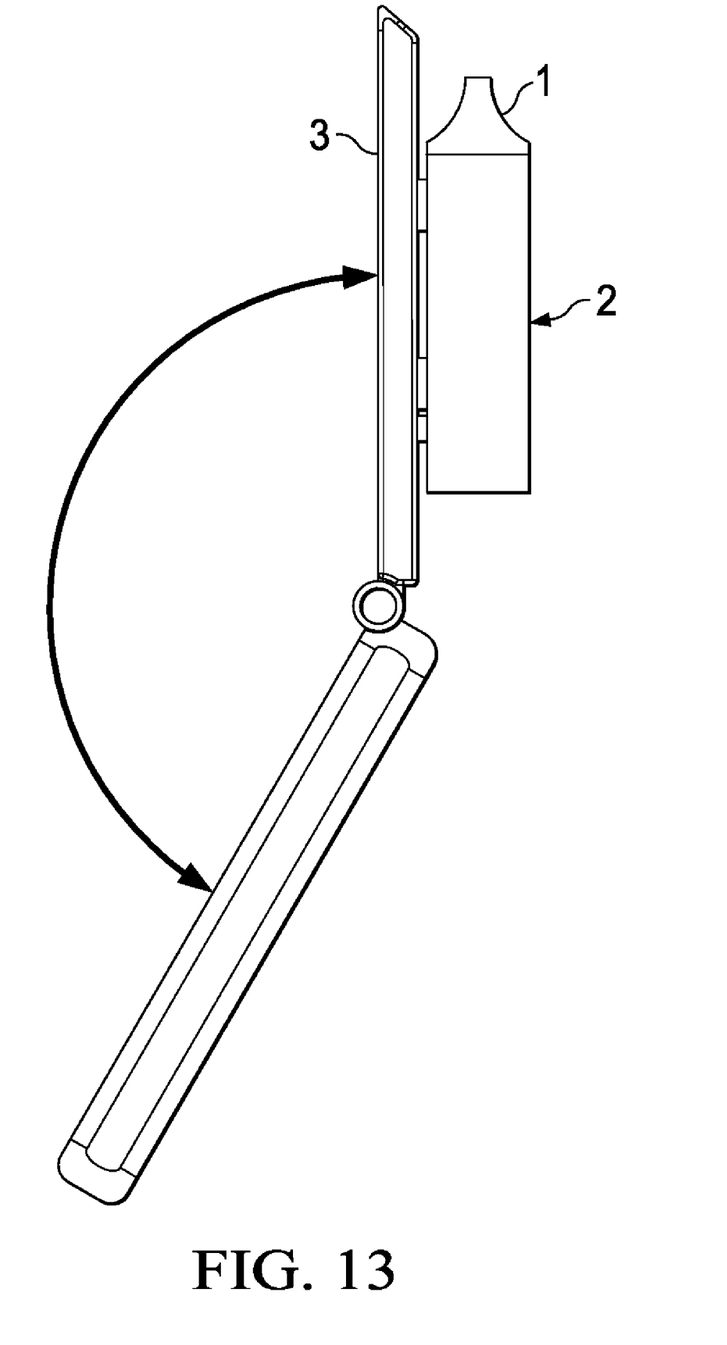
FIG. 13 illustrates a side view of another embodiment.
Figure 14A:
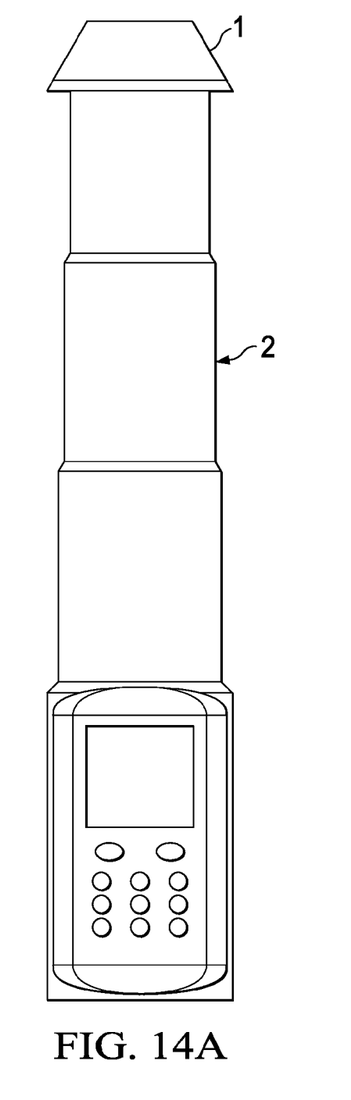
FIG. 14a illustrates a front view of another embodiment.
Figure 14B:
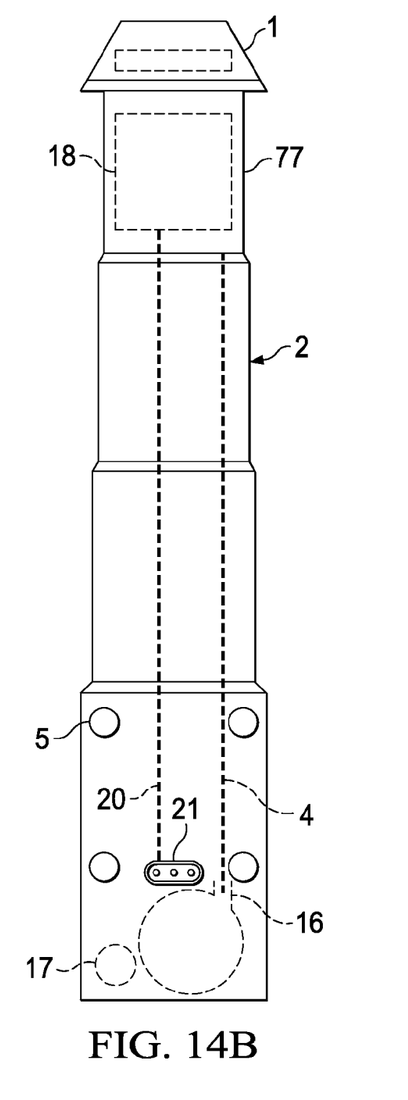
FIG. 14b illustrates a cross-sectional view of another embodiment.
Figure 15A:
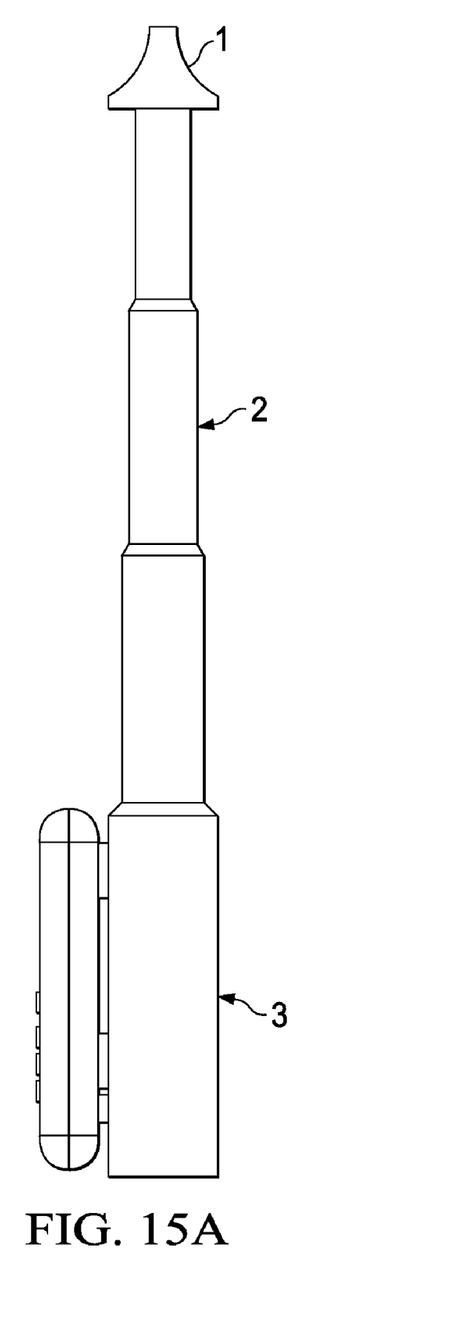
FIG. 15a illustrates a side view of another embodiment.
Figure 15B:
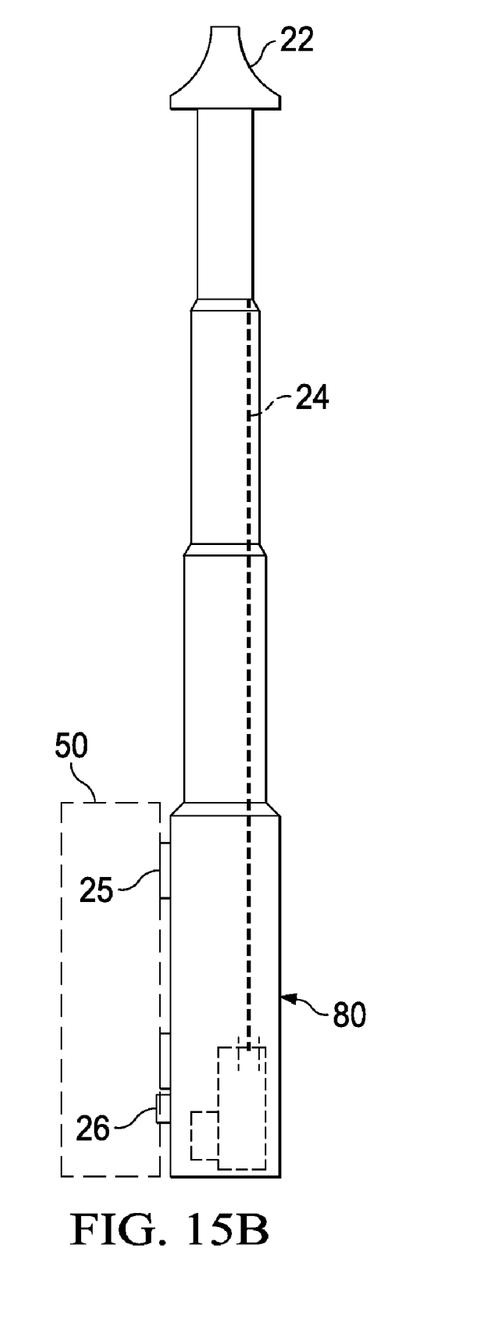
FIG. 15b illustrates a cross-sectional view of another embodiment.
Figure 16:
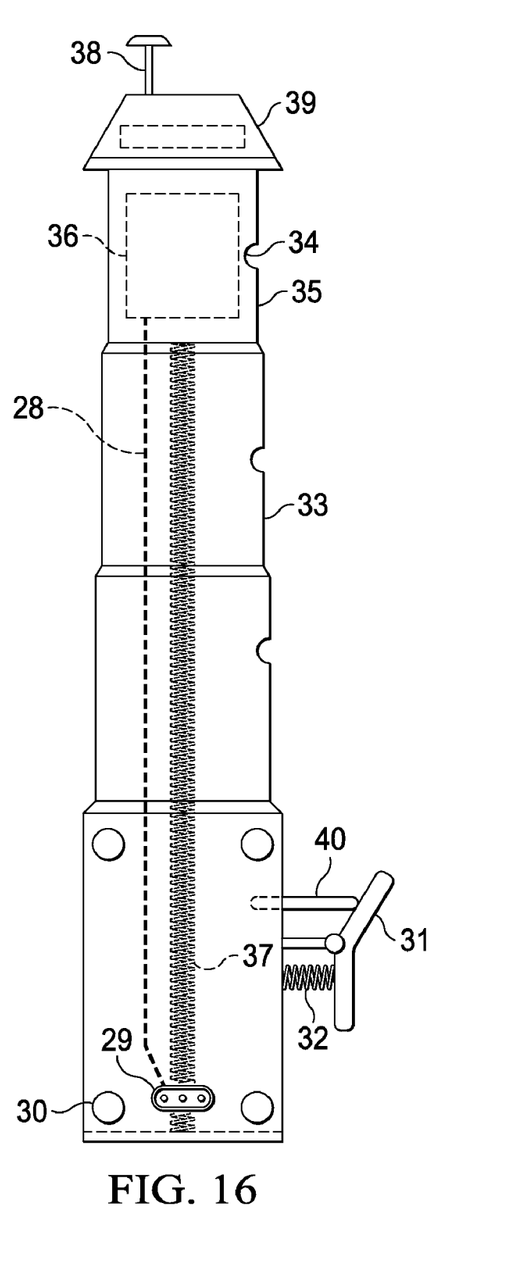
FIG. 16 illustrates a side view of another embodiment.
Figure 17:
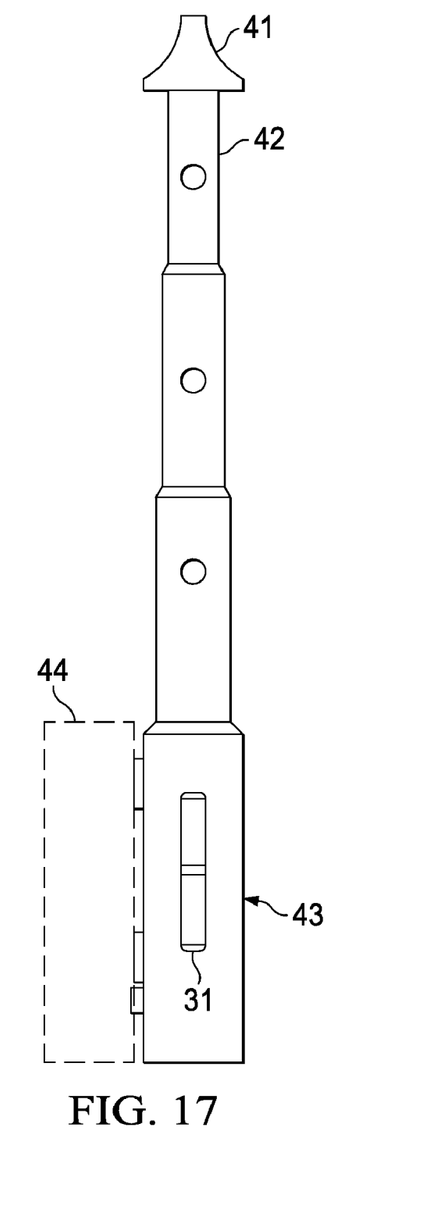
FIG. 17 illustrates a side view of another embodiment.
Figure 19:
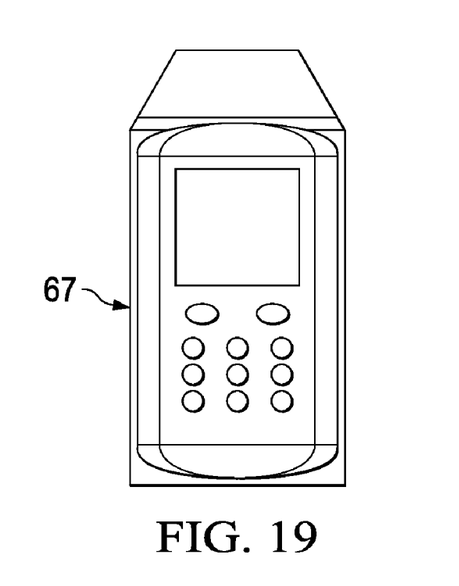
FIG. 19 illustrates a front view of the cellular phone with another embodiment.

This first embodiment of the present invention can be characterized as a transmitter isolator. As shown in FIG. 1, this embodiment utilizes a sectional arrangement to accomplish this. Referring to FIG. 1, there is shown an inventive radiation reducing unit in especially reducing this radiation concentration to the head and hands. This device comprises hand grip 1, cavity 2, mast sections 4, transmitter 3, bracket 5, mounting points 6, light signal emitter and receiver at base of cavity 7, light signal emitter and receiver 8 and antenna area 9;

FIG. 2 illustrates the hand grip 1, cavity 2, mast 3, mounting point 4, bracket 5, light signal emitters and receiver system 6, light signal emitters and receiver system 7, connection jack for controls 8;

FIG. 3 illustrates the hand grip 1, mounting points 2, transmitter 3, cavity 7, light emitter and receiver system at bottom of cavity 6 connection jack for control 4;

FIG. 4 illustrates the hand grip 1, mounting points 2, cavity 3, mast 14, and bracket 15;

FIG. 5 illustrates the hand grip 1, and the front view of cellular phone mounted on safety mast;

FIG. 6 illustrates the side view of safety mast in retracted state mounted on back of cellular phone;

FIG. 7 illustrates the double safety mast of another invention, hand grip 1, mast sections 2, the double mast base section that is now extended from its bracket 3, bracket 4, mounting points 5, fiber optics material 6 and shaft on which the double mast is mounted on accommodate lateral movement 7, cavity 8, and control connection jack 9;

FIG. 7 shows sectional front view of another preferred embodiment of the invention;

FIG. 8 shows a side view of the preferred embodiment in FIG. 7;

FIG. 8 shows the side view of FIG. 7 in an extended mode;

FIG. 9 shows a sectional front view of preferred embodiment of the present invention in FIG. 7;

FIG. 10 shows a side view of the preferred embodiment in FIG. 7;

FIG. 11 shows a section in side view of another preferred embodiment of the invention;

FIG. 12 shows a section front view of the preferred embodiment on the invention attached to subject unit on the cellular phone in FIG. 11;

FIG. 13 shows a side view of the preferred embodiment of the invention in FIG. 13;

FIG. 14A and FIG. 14B illustrates the hand grip 1, antenna 19, transmitter 18, fiber optic lines mounting point 5 and cellular phone connection jack 21; reversible electric motor 17, cavity 77, mast 2, bracket 3, flexible shaft 4, and spool 16;

FIG. 15A and FIG. 15B illustrates the hand grip 22, mast 23, flexible shaft 24, bracket 80, cell phone connection jack 26, mounting points 25, and cell phone mounting area 50;

FIG. 14A and FIG. 14B shows cellular phone mounted on the mast unit from view mast is now extended mode, hand grip 1, and mast 2;

FIG. 15A and FIG. 15B shows side view of invention while in extended mode hand grip 1, mast 2, bracket 3, and cell phone 4;

FIG. 19 illustrates the cell phone mounted on the preferred embodiment of FIG. 17;

FIG. 16 illustrates the antenna 38, mast 39, transmitter 36, mounting point 30, bracket 27, fiber optic lines notch area 34, cavity 35, spring for extending mast 37, mast 33, mast release button for the extending 31. latch 40, button return spring 32, and connection jack to cell phone 29

Figure 18:
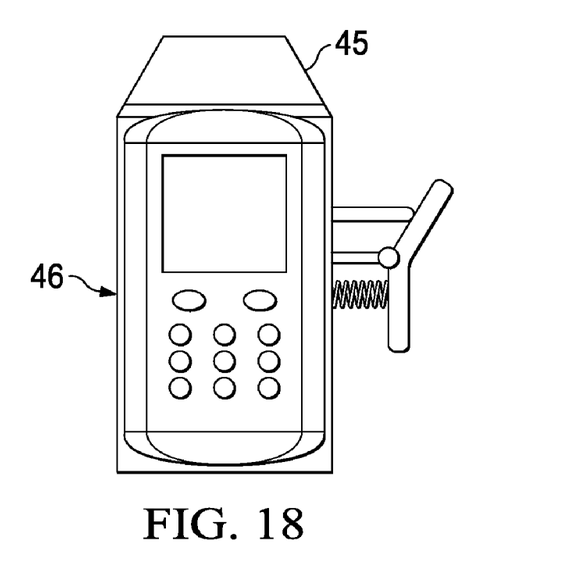
FIG. 18 illustrates a front view of the cellular phone with the another embodiment.

FIG. 17 illustrates the hand grip 41, cavity 42, bracket 43, and the area were cell phone would be mounted on invention 44;

FIG. 18 illustrates the hand grip 45, and the sectional front view of cellular phone mounted on preferred invention;

FIG. 14A and FIG. 14B shows a sectional front view another preferred embodiment on this invention;

FIG. 15A and FIG. 15B shows a sectional side view of the preferred embodiment in FIG. 14A and FIG. 14B;

FIG. 19 shows a sectional front view subject attached to the preferred embodiment, in FIG. 14A and FIG. 14B;

FIG. 16 shows a sectional front view of another preferred embodiment on the invention;

FIG. 17 shows a sectional side view of the preferred embodiment in FIG. 16; and

FIG. 18 shows a front sectional view of subject attachment to preferred embodiment, in FIG. 16.

FIG. 14A and FIG. 14B shows a sectional front view another preferred embodiment on this invention;

FIG. 15A and FIG. 15B shows a sectional side view of the preferred embodiment in FIG. 14A and FIG. 14B;

FIG. 16 shows a sectional front view of another preferred embodiment on the invention;

FIG. 17 shows a sectional side view of the preferred embodiment in FIG. 16; and

FIG. 18 shows a front sectional view of subject attachment to preferred embodiment, in FIG. 16.

FIG. 19 shows a sectional front view subject attached to the preferred embodiment, in FIG. 14A and FIG. 14B;

The invention claimed is:

1. A safety mast for reducing the dispersion of electromagnetic radiation to the operator, comprising:
   a transmitter to transmit the electromagnetic radiation;
   a control for the user to control the safety mast;
   the control being optically connected to the transmitter; and
   a spring to extend the safety mast.

2. A safety mast for reducing the dispersion of electromagnetic radiation to the operator as in claim 1, wherein the safety mast includes a button to release the spring.

3. A safety mast for reducing the dispersion of electromagnetic radiation to the operator as in claim 1, wherein the safety mast includes a electric motor to drive the safety mast.

4. A safety mast for reducing the dispersion of electromagnetic radiation to the operator as in claim 1, wherein the transmitter is connected to a cell phone.

5. A safety mast for reducing the dispersion of electromagnetic radiation to the operator as in claim 1, wherein the transmitter is connected to a walkie-talkie.

6. A safety mast for reducing the dispersion of electromagnetic radiation to the operator as in claim 1, wherein the safety mast includes multiple sections which telescope together.

7. A safety mast for reducing the dispersion of electromagnetic radiation to the operator as in claim 6, wherein the multiple sections telescope manually.

8. A safety mast for reducing the dispersion of electromagnetic radiation to the operator as in claim 1, wherein the safety mast includes two independent masts.

9. A safety mast for reducing the dispersion of electromagnetic radiation to the operator as in claim 1, wherein the safety mast utilizes an electromechanical arrangement to extend a portion of the safety mast.

10. A safety mast for reducing the dispersion of electromagnetic radiation to the operator as in claim 1, wherein the safety mast includes a tube to align the spring.

11. A safety mast for reducing the dispersion of electromagnetic radiation to the operator as in claim 1, wherein the safety mask is raised and lowered by an electric motor.

* * * * *